(12) United States Patent
Kmecko

(10) Patent No.: US 7,480,089 B2
(45) Date of Patent: Jan. 20, 2009

(54) MICROMIRROR SYSTEM WITH ELECTROTHERMAL ACTUATOR MECHANISM

(75) Inventor: Ivan Kmecko, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 305 days.

(21) Appl. No.: 11/380,162

(22) Filed: Apr. 25, 2006

(65) Prior Publication Data

US 2007/0247705 A1 Oct. 25, 2007

(51) Int. Cl.
G02B 7/02 (2006.01)

(52) U.S. Cl. ............... 359/290; 359/291; 359/223; 359/224

(58) Field of Classification Search ......... 359/290, 359/291, 295, 223, 224, 292
See application file for complete search history.

(56) References Cited

U.S. PATENT DOCUMENTS

2007/0103029 A1* 5/2007 Fedder et al. ............... 310/307

* cited by examiner

Primary Examiner—Timothy J Thompson
(74) Attorney, Agent, or Firm—Wade James Brady, III; Frederick J. Telecky. Jr.

(57) ABSTRACT

The disclosed embodiments combine an electrothermal actuator system with an electrostatic attraction system, in order to orient bistable micromirrors in digital micromirror devices (DMDs). The micromirror, pivotally supported, can switch between two orientations. While typical DMD systems use electrostatic electrodes to orient the micromirror, stiction forces can restrict micromirror motion, affecting optical performance. The disclosed embodiments use an electrothermal actuation system to mechanically assist the electrodes, overcoming stiction without the need for a high-voltage reset pulse.

28 Claims, 4 Drawing Sheets

MICROMIRROR SYSTEM WITH ELECTROTHERMAL ACTUATOR MECHANISM

FIELD OF THE INVENTION

The disclosed embodiments herein relate generally to the use of digital micromirror technology to provide image display capability as part of a digital light projection system, and more particularly to an electrothermal actuator mechanism to improve the control characteristics of micromirror orientation.

BACKGROUND OF THE INVENTION

Digital light projection (DLP) technology has been increasingly used for optical display systems, such as those found in upscale home theater systems. This technology has begun replacing traditional cathode ray tube technology, since it can provide high image quality, without the bulk and power requirements associated with the older technology.

In essence, a DLP system is comprised of a digital micromirror device (DMD), made up of an array of thousands or even millions of bistable mirror elements, interacting with a light source and a projection surface. Each of the mirror elements of the DMD may switch between two positions, corresponding to an open or closed light configuration, based on the angle at which the mirror tilts towards the light source. A micromirror is in an open position when it is oriented to reflect the light source onto the projection surface. A micromirror is in a closed position when it is oriented so that none of the light provided by the light source is projected onto the projection surface. Thus, each micromirror can be oriented in either an open or "on" position, or a closed or "off" position.

By rapidly turning a particular micromirror "on" and "off", the appropriate shade of light can be projected for a particular pixel on the projection surface. And color hues may also be added to a DMD projection system by time multiplexing of the white light source through a color wheel. In practice, the micromirrors alternate between open and closed positions so fast that the human eye cannot discern the discreet "on" and "off" positions of each micromirror. Instead, the human eye extrapolates the discreet binary images projected by each mirror element into a wide variety of pixel shades and hues. In this way, DMDs allow for the accurate reproduction of the whole array of necessary shades and hues by taking advantage of the human eye's averaging of quickly varying brightnesses and colors.

Typically, each micromirror is oriented in either the open or closed position using electrostatic forces generated by corresponding electrodes. Each micromirror is located atop a hinge mechanism, and an electrode is located on either side of the hinge. These electrodes are typically formed on a semiconductor substrate beneath the micromirrors. Whenever an appropriate voltage is applied to an electrode, it creates an electrostatic force capable of pivoting the micromirror on its hinge. Only one of the two electrodes will be active at any specific moment in time, corresponding to either the open or closed position. By way of example, if a sufficient voltage is applied to the first electrode, then its micromirror would be pulled out of its neutral alignment, so that it angles towards the light source and will reflect light onto the projection surface. This would correspond to an open or "on" position for the micromirror. If a sufficient voltage is applied to the second electrode for the same micromirror (while there is no voltage applied to the first electrode), then the micromirror would pivot to angle away from the light source. In this closed or "off" position, no light would be reflected upon the projection surface. So, each micromirror pivots between open and closed positions based on the electrostatic forces applied on the mirror by the electrodes on either side of the pivot point.

This conventional DMD approach generally works well, allowing for quite accurate and crisp image reproduction quality. Nevertheless, DMD image quality has historically been impacted by stiction, which is a tendency for each micromirror element to stick when in contact with the electrode contact surface (against which the electrostatic force holds the micromirror in either the open or closed position). This stiction is associated with Van der Waal's forces, surface contamination, and surface friction, and can cause a delay in the movement of the micromirrors, resulting in possible image degradation.

To overcome this stiction problem, conventional DMDs apply large voltages to the electrodes and the micromirrors in sequence, essentially pulsing the electrodes and the micromirrors to reorient the micromirrors into their neutral starting position. This type of reset pulse breaks the stiction, and allows the micromirrors to move freely from one orientation to another. But the use of high-voltage pulses to overcome stiction acts as a limiting factor concerning the size and expense of DMDs, since the transistors operating the electrodes must be capable of handling the high voltage needed to overcome stiction. Likewise, the use of high voltages requires a sufficient gap between each of the micromirrors in order to prevent micromirrors with different voltages from being mutually attracted, and this gap requirement acts as a limitation on the contrast available for the DMD. So, problems associated with the present high-voltage pulse technique for overcoming stiction have led to investigations into alternative techniques for addressing stiction problems.

BRIEF SUMMARY OF THE INVENTION

Disclosed below are approaches that overcome the stiction problem discussed above, without the negative side effects associated with the conventional, high-voltage pulse fix. Disclosed embodiments use an electrothermal actuator, in conjunction with conventional electrostatic electrodes, to adjust the orientation of micromirrors.

Each disclosed embodiment comprises a micromirror mounted atop a hinge above a substrate. This hinge serves as a pivot point, allowing the micromirror to tilt from one position to another. Typically, the hinge would be torqued so that it provides a restorative force whenever the micromirror is deflected out of its neutral state. Beneath this hinge lie two layers involved in manipulating the micromirror to control orientation. The first layer includes the electrostatic electrodes. These electrodes provide electrostatic forces for tilting the micromirror. At least one electrode is located beneath the micromirror on each side of the hinge. When voltage is applied to the first electrode, the micromirror tilts about the hinge to face towards the light source (into open position); but when voltage is applied to the second electrode, the micromirror tilts about the hinge to face away from the light source (into closed position). Thus, by switching the voltage from one electrode to the other, the micromirror can be opened and closed as needed.

The electrostatic electrode arrangement described above is fairly typical for such DMD devices. Disclosed embodiments below, however, further comprise a second layer for electrothermal activation of the micromirror. These electrothermal actuators assist the electrodes in overcoming stiction, so that the micromirrors can be effectively oriented to faithfully reproduce the desired image. The electrothermal actuators provide additional strength to the system, working in conjunction with the electrodes to properly orient the micromirrors despite any stiction forces. And because the electrothermal actuators do not rely on increased electrostatic voltages, stiction can be overcome without the need to use a high-voltage pulse.

Disclosed electrothermal actuators comprise bimetallic arms, which flex upward upon heating. In this sort of arrangement, there are two bimetallic arms, with each placed to overcome stiction between the micromirror and an electrode stop on one side of the hinge. Thus, when current flows through one of the bimetallic arms, it heats up and flexes upward, breaking the stiction force between micromirror and electrode.

The presence of the bimetallic actuators allows stiction forces to be overcome mechanically, as the bimetallic arms basically pry the micromirror away from the electrode stop upon heating. This allows the electrodes to effectively orient the micromirror (by controlling which way the micromirror tilts about the hinge) using much lower voltages (since the electrostatic force applied by the electrodes does not have to be strong enough to overcome stiction, but merely to move the micromirror once it is in a neutral position). Using lower voltages allows for miniaturization of DMD devices, since the transistors sending power to each electrode can be smaller. Such lower voltage requirements also allow DMDs to be built less expensively, since smaller, less expensive transistors can handle the lower voltages. The disclosed embodiments also carry the potential for better contrast and image quality, since the lower voltage requirement and the constant voltage applied to the micromirrors allows for a smaller gap between the micromirrors without the concern that micromirrors will be attracted to each other. In addition, the disclosed embodiments enable a faster pixel, by overcoming stiction to allow the micromirrors to switch more quickly between bistable positions. Again, this speed advantage may improve image reproduction quality.

The above summary generally describes certain of the disclosed embodiments. A more detailed description of the embodiments and alternatives follows, with specific reference to the illustrative figures.

BRIEF DESCRIPTION OF DRAWINGS

For a more detailed understanding of the embodiments, reference is made to the following drawings.

DETAILED DESCRIPTION OF THE INVENTION

Figure 1:
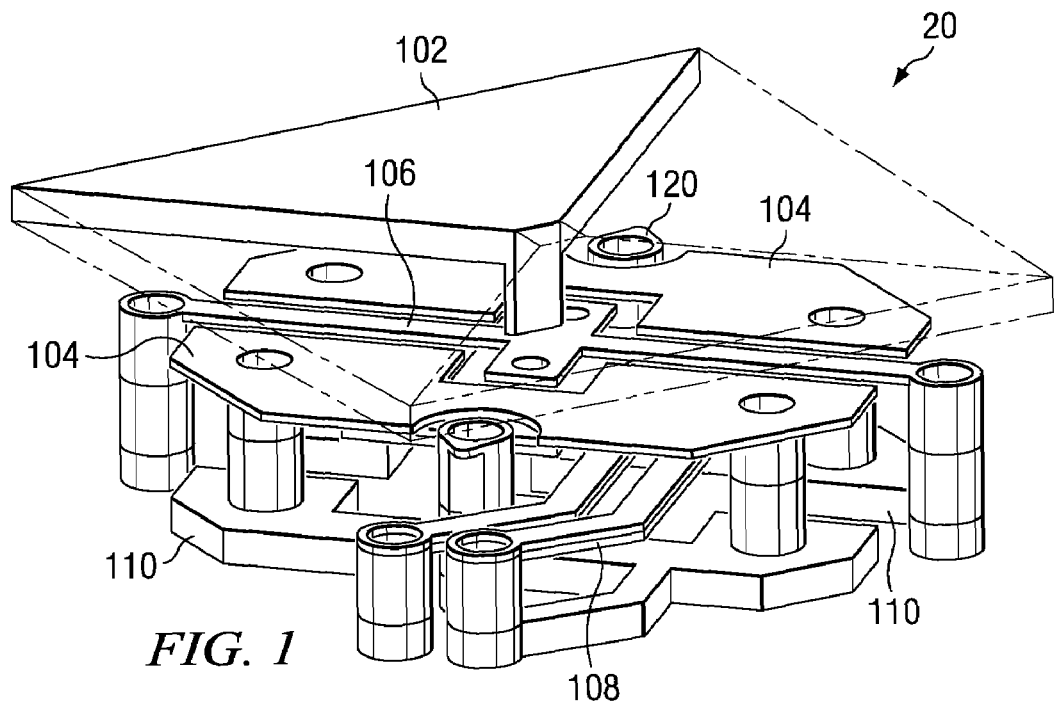
FIG. 1 is a perspective view of an embodiment of a DMD pixel with electrothermal actuators as a whole, with a cutaway of the micromirror to provide a better view of the various component parts.

As shown in FIG. 1, one embodiment of DMD pixel device 20 couples electrothermal actuator elements with electrostatic actuator elements, in order to jointly orient a bistable micromirror 102 (which is shown with a cutaway of ¾ of the micromirror 102 with the remainder of the micromirror 102 illustrated by ghosted line features). The disclosed electrostatic actuator uses electrodes on either side of the micromirror pivot to attract the micromirror 102, pulling it downward into contact with a stop rest 120. This electrostatic orientation of the micromirror 102 is accomplished by applying a constant voltage to the micromirror 102, and selectively applying a voltage to the electrodes. The voltage difference results in electrostatic attraction, orienting the micromirror 102 into either an open or closed position.

While this electrostatic attraction is one element of the described device 20, electrothermal actuators are further provided to assist in orienting the micromirror 102. These electrothermal actuators heat up under the influence of electrical current, due to internal resistance. The heat generated by current flow causes the electrothermal actuators to deflect, and this deflection provides a mechanical force that aids in overcoming stiction. In this way, electrothermal actuators assist the electrostatic force in positioning the micromirror 102.

There are several possible electrothermal actuator mechanisms that could function effectively in an embodiment such as the one illustrated in FIG. 1. For example, a bimetallic arm 108 could form one type of electrothermal actuator. A bimetallic arm 108 is comprised of two separate layers of materials, 108*a* and 108*b*, joined together to form a unified whole. At least one of the layers of the bimetallic arm 108 would be an imperfect conductor, providing a resistive electrical pathway for current flow, and thereby generating heat. The two layers 108*a*, 108*b* of the bimetallic arm would also have different coefficients of thermal expansion, causing the deflection of the bimetallic arm 108 upon heating.

When current flows through such a bimetallic arm 108, it heats up and deflects. Basically, the heat generated by the current causes both layers 108*a* and 108*b* of the bimetallic arm to expand. Each layer expands to a different degree, however, based upon their respective coefficients of thermal expansion. This differing degree of expansion between the two joined layers of the bimetallic arm 108 causes the bimetallic arm 108 to deflect, so that it may serve as a mechanical pry, overcoming any stiction experienced by the micromirror 102.

The greater the difference in the coefficients of thermal expansion between layers 108*a* and 108*b* of the bimetallic arms 108, the greater the deflection of the bimetallic arms 108 would be for a given temperature. Likewise, the internal electrical resistance of the layer of the bimetallic arm serving as the conductive pathway would affect the heat generated within the bimetallic arms 108 for a given current. Thus, the response characteristics of the bimetallic arms 108 result from the interplay of the material properties of the upper and lower layers 108*a* and 108*b* of the bimetallic arms. This allows a degree of fine tuning of the operation of the bimetallic arms 108, based upon material selection characteristics.

For the embodiment illustrated in FIG. 1, the circuit is configured such that the electrothermal actuators work in conjunction with the electrostatic actuators. Thus, the bimetallic arm 108 will typically push upward on one side of the micromirror 102, while the electrostatic force generated by the electrodes pulls down on the other side of the micromirror 102. This push/pull interaction of mechanical and electrostatic forces allows for effective micromirror 102 orientation, without the need for high voltages.

Figure 2:
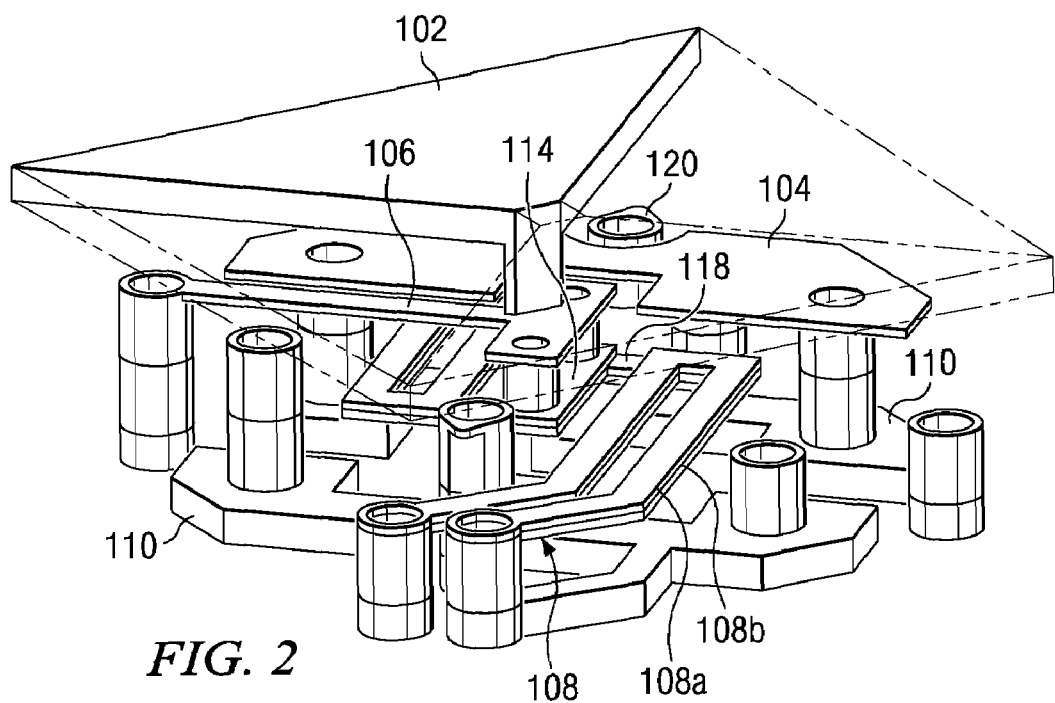
FIG. 2 is a perspective view similar to FIG. 1, cutaway and angled to show the various component parts more clearly.

Still referring to FIG. 1, with further reference to FIG. 2, the micromirror 102 is a flat, reflective surface mounted to pivot from one side to the other about a hinge. There are electrodes on either side of the pivot line (represented by the hinge), and bimetallic arms 108 extend out under the micromirror 102 on either side of the hinge. In this specific embodiment, the hinge is further constructed of a hinge bar 106 and a pivot platform 114.

The hinge bar 106 is mounted atop the pivot platform 114, and serves as the pivot line about which the micromirror 102 pivots between its two bistable positions.

The embodiment shown in FIGS. 1 and 2 also employs electrode pairs, rather than single electrodes, with two electrodes on each side of the hinge. While this configuration is not necessary, the use of electrode pairs improves the efficiency of operation of the electrostatic force in acting upon the micromirror 102. Each electrode pair includes an upper 104 and a lower 110 electrode. The upper electrode 104 directly influences the micromirror 102 using the electrostatic force of attraction. The lower electrode 110, on the other hand, influences the pivot platform 114 upon which the mirror is mounted with the electrostatic force of attraction. By using these dual electrostatic attractors, the electrostatic force for orienting the micromirror 102 can be maximized while minimizing the voltage.

FIGS. 1 and 2 show each of the bimetallic arms 108 extending out between the upper 104 and lower 110 electrodes of each electrode pair, and interacting with the pivot platform 114 via a connector bar 118 Typically, the connector bar 118 is somewhat flexible, such that it may deflect as the bimetallic arms 108 move. It is by this attachment of the bimetallic arms 108 to the pivot platform 114 that the bimetallic arms 108 of the disclosed embodiment mechanically assist in orienting the micromirror 102.

In the embodiment of FIGS. 1 and 2, the bimetallic arms 108 have a cantilevered shape, extending outward from two supports to hang between the electrode pairs in proximity to the pivot platform 114. Each bimetallic arm 108 also provides a continuous current pathway, leading from one cantilever support (that also serve as electrodes for current flow) to the other. This allows the necessary current flow through the bimetallic arms 108 by completing the circuit. While any shape that provides a continuous current pathway would serve effectively, the bimetallic arms 108 shown in FIGS. 1 and 2 employ two parallel strips extending outward from the supports, linked together at their unsupported ends. Furthermore, this embodiment has the bimetallic arms 108 oriented so that, when in their undeflected state (i.e. without the influence of heat from the current), the bimetallic arms 108 angle slightly downward as they extend outward. While this downward orientation is not necessary for the functioning of the DMD pixel device 20, it further aids in the mechanical pivot action applied to the micromirror 102 by providing both an upward push on one side of the pivot platform 114 and a downward pull on the other side of the pivot platform 114.

The bimetallic arms 108 in the embodiment of FIGS. 1 and 2 are constructed so that the upper layer 108a has a lower coefficient of thermal expansion than the lower layer 108b. This means that the bimetallic arms 108 will deflect upward when heated. While several materials could effectively provide this result, in the disclosed embodiment, the lower layer of each bimetallic arm 108b is comprised of titanium nitride, while the upper layer 108a is comprised of silicon dioxide. Titanium nitride is particularly suited to this application, since its electrical resistance can be controlled by varying its composition. Silicon dioxide, while not conductive, has an appropriate coefficient of thermal expansion when compared to titanium nitride, creating an effective bimetallic arm 108 deflection.

In operation, the current and voltage of the embodiment of FIGS. 1 and 2 are synchronized to switch simultaneously, so that the electrothermal actuator and the electrostatic actuator work in conjunction. By coordinating the application of voltage and current respectively, one pair of electrodes (104 and 110) exerts a downward force, pulling down on one side of the micromirror 102 and on one side of the pivot platform 114 (the same side), while simultaneously, current flows into the corresponding bimetallic arm 108, heating it so that it pushes upward on the opposite side of the pivot platform 114, via the connector bar 118. And in the embodiment of FIGS. 1 and 2, in which the unflexed bimetallic arms 108 are angled slightly downward, the remaining bimetallic arm 108 pulls downward on the pivot platform 114, via the connector bar 118, on the same side as the electrostatic force from the electrodes (104 and 110). Thus, the micromirror 102 hinge tilts, under the combined influences of the electrostatic force from the electrodes 104 and 110 and the mechanical force applied by the electrothermal bimetallic actuators 108. The combined push/pull effect of these forces on the hinge tilts the micromirror 102 into one of its bistable positions, in contact with stop 120. By combining electrothermal and electrostatic actuators, stiction forces can be overcome without the need for high voltages. In the disclosed embodiment of FIG. 1, electrical current would usually only be applied to the bimetallic actuator 108 during the transition period, in order to assist the electrostatic force in overcoming stiction; once the micromirror 102 has been oriented, the current typically would be cut off such that the micromirror 102 would be held in position solely by the electrostatic force of the electrodes 104 and 110. By applying current to the electrothermal actuators 108 briefly during the transition period, the heat generated by the device may be kept to a manageable level.

Figure 3:
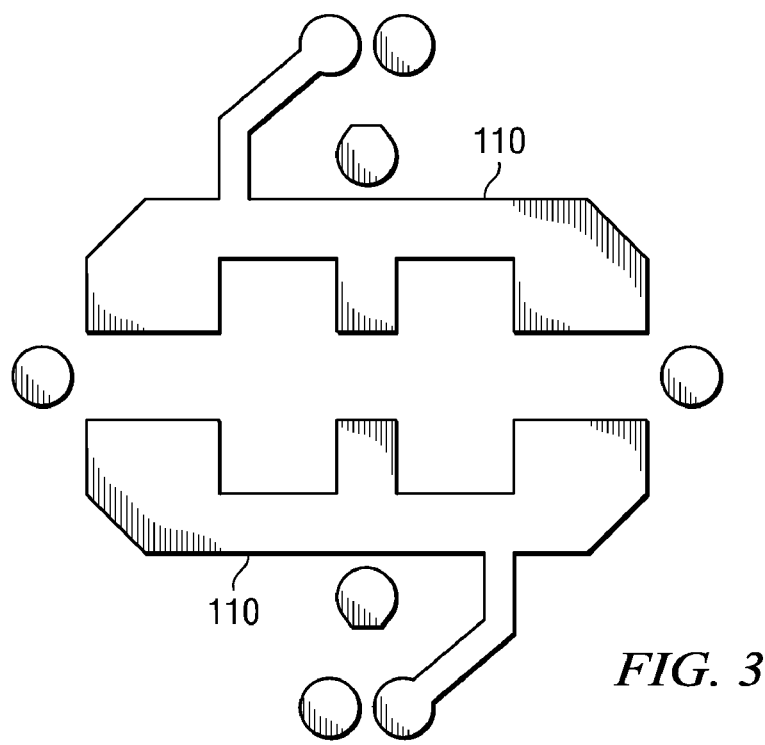
FIG. 3 is a section plan view of the lower electrodes.
Figure 4:
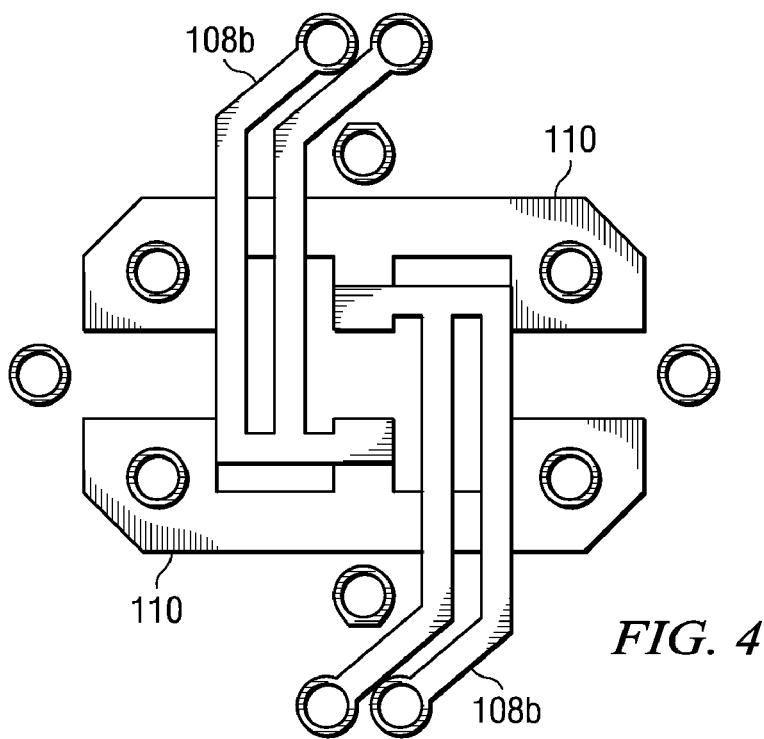
FIG. 4 is a section plan view showing the lower layer of the bimetallic arms in relation to the lower electrodes.
Figure 5:
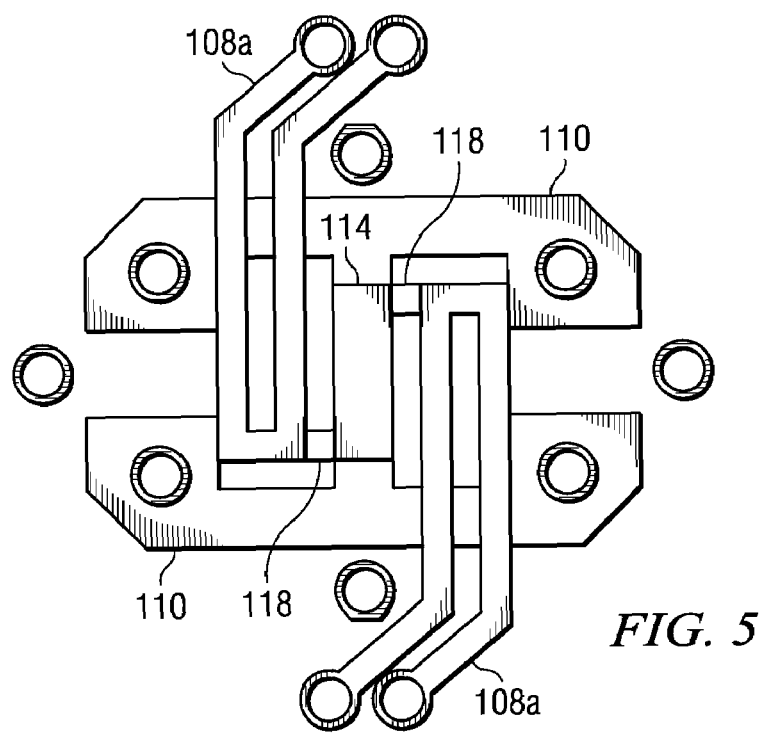
FIG. 5 is a section plan view showing the upper layer of the bimetallic arms as well as the hinge platform, in relation to the lower electrodes.

While FIGS. 1 and 2 illustrate an embodiment of the DMD pixel device 20 in its entirety, showing the interaction between the various elements, FIGS. 3 through 7 provide additional detail, illustrating the various levels of this embodiment using a series of sectional diagrams. These additional figures provide a series of sectional illustrations, moving from the bottom to the top of the DMD pixel device. FIG. 3 shows an embodiment of the two lower electrodes 110 of the electrode pairs. One electrode 110 is located on each side of the pivot line, and the two electrodes 110 form mirror images in this embodiment. FIG. 4 illustrates a sectional plan view one level above the lower electrodes 110. Thus, FIG. 4 shows the lower layer of the bimetallic arms 108b and the connector bars 118 which will join the bimetallic arms 108 to the pivot platform 114. FIG. 5 shows a sectional plan view one level above that of FIG. 4, illustrating the upper layer of the bimetallic arms 108a, as well as the pivot platform 114. The upper layer of the bimetallic arms 108a lays directly atop the lower layer 108b, and the pivot platform 114 is rigidly connected to the lower layer of each bimetallic arm 108b by connector bar 118.

Figure 6:
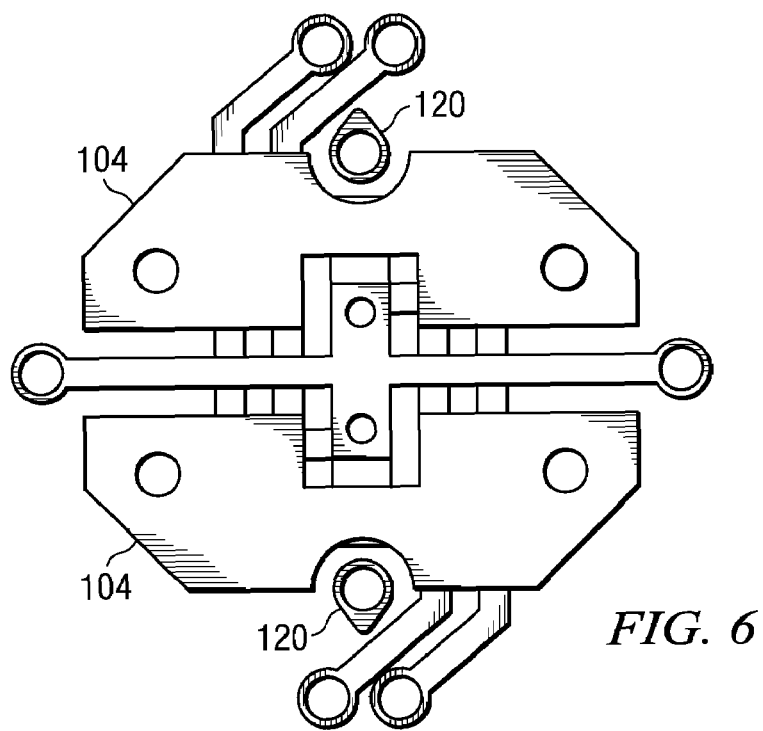
FIG. 6 is a section plan view showing the upper electrodes and the hinge.
Figure 7:
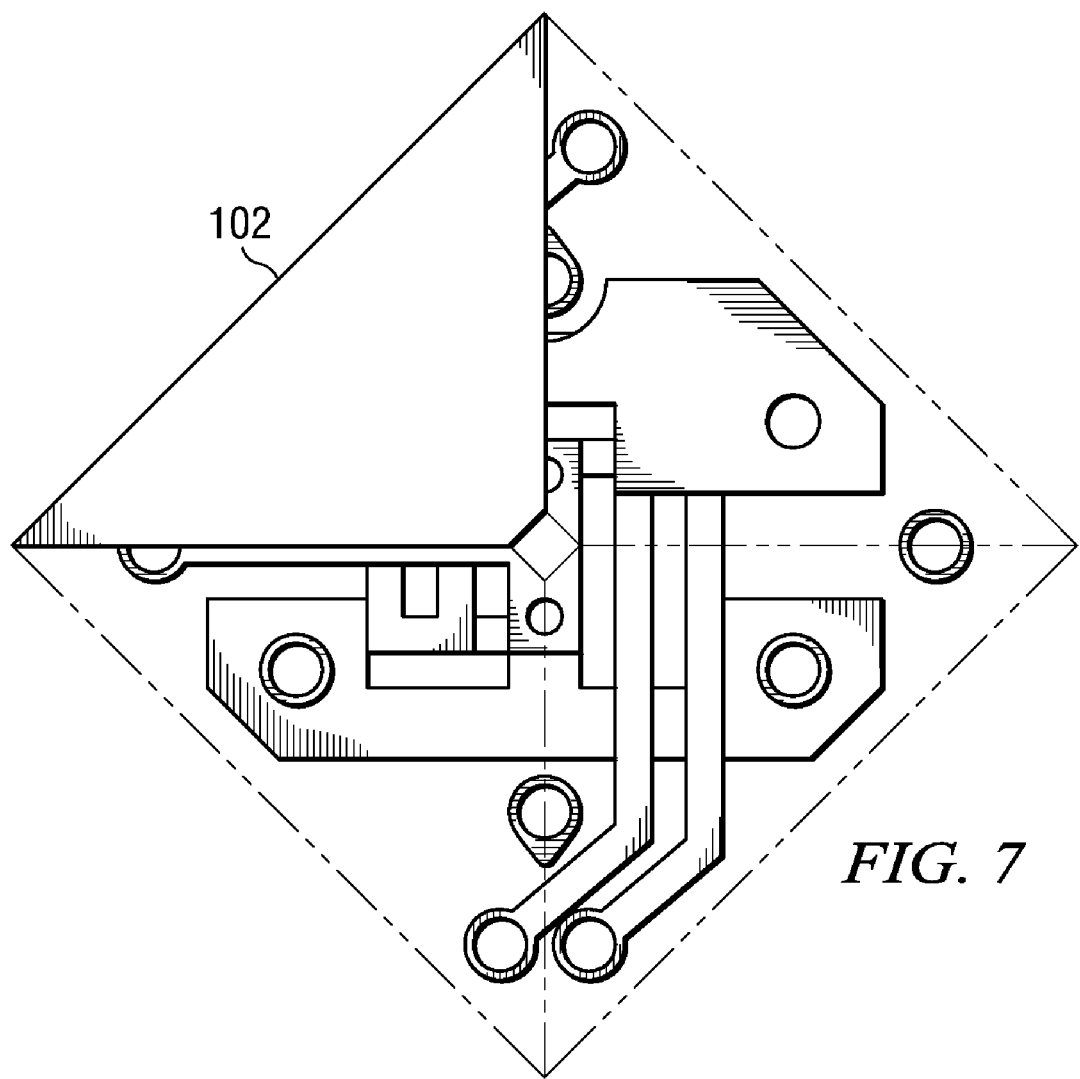
FIG. 7 is a cutaway plan view showing the micromirror in relation to the underlying elements of the DMD pixel.

FIG. 6 shows a sectional plan view yet another level upward. At this level, the two upper electrodes 104 are located, one on each side of the pivot line. Again, these upper electrodes 104 form mirror images in this embodiment. The hinge bar 106 is also shown in FIG. 6, located upon the pivot platform 114, and elevated slightly above the upper electrodes 104 in order to allow the micromirror 102 to pivot. FIG. 7 then further illustrates the micromirror 102, resting atop the hinge bar 106, showing a cutaway plan view that reveals all of the levels of this embodiment of the DMD pixel device interacting as a whole.

Together, these figures illustrate one embodiment of the present DMD pixel device 20. It should be understood, however, that there are several alternative embodiments, all of which would be effective. For example, while the embodiment of FIG. 1 shows electrode pairs on each side of the pivot line, a single electrode located on each side of the pivot line would also operate to apply an electrostatic force upon the micromirror 102 and/or pivot platform. And while the electrodes in the embodiment of FIG. 1 are located beneath the micromirror, so that the electrostatic force pulls downward on the micromirror, the electrodes could also be located above the micromirror, pulling the micromirror upward using the electrostatic force of attraction. In addition, the particular electrothermal actuator used in the embodiment of FIG. 2 is simply one alternative. Other electrothermal actuators, such as arms constructed of memory metal, would also function. Likewise, other materials could be used to construct effective bimetallic arms 108. Other effective embodiments of the DMD pixel device 20 could employ bimetallic arms 108 in which the lower layer 108b has the lower coefficient of thermal expansion, and the arms 108 are angled upward when in their neutral, unflexed position. This would mean that the bimetallic arms 108 would work essentially in reverse of the manner set forth above for the embodiment of FIG. 1, acting as a mechanical input on the micromirror 102 when undeflected, and deflecting to remove the upward force when current is applied. And the bimetallic arms 108 could also be designed to interact directly with the micromirror 102, rather than influencing the micromirror 102 through the pivot platform 114.

Likewise, the disclosed embodiments are not limited to use with digital micromirrors. A combination of electrostatic and electrothermal actuators could be applied to orient any sort of element. While the above described embodiments discuss flat, reflective surfaces serving as micromirrors, they could be applied to any micromechanical element needing to change orientation. And while the embodiment of FIG. 1 discusses both the electrode pairs and the bimetallic arms as being mirror images, so that they exert identical but opposite forces upon the micromirror, this need not be the case. Indeed, the electrothermal actuators described above could also be used in conjunction with additional actuator means other than electrostatic. In short, while the DMD pixel device 20 has been described with reference to specific embodiments and uses, this description is purely illustrative and is not intended to be construed in a limiting sense. A host of modifications of the disclosed embodiments, as well as alternative embodiments, will be apparent to persons skilled in the art field. These and all other embodiments are intended to be included within the scope of this DMD pixel device invention, which is more fully described within the claims below.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of the Invention," the claims should not be limited by the language chosen under this heading to describe the so-called field. Further, a description of a technology in the "Background of the Invention" is not to be construed as an admission that certain technology is prior art to any invention(s) in this disclosure. Neither is the "Brief Summary of the Invention" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What I claim is:

1. A device comprising:
   a substrate;
   a micromirror mounted to the substrate in such a way as to pivot between two stable positions;
   an electrostatic actuator in electrical communication with the micromirror in such a way as to allow for electrostatically moving the micromirror between the two stable positions; and
   an electrothermal actuator mechanically coupled to the micromirror in such a way as to apply a mechanical force to the micromirror to assist in moving the micromirror between the two stable positions.

2. A device as in claim 1 further comprising a hinge, wherein the micromirror is mounted to the substrate by the hinge and pivots between its bistable positions about the hinge.

3. A device as in claim 2, wherein the electrothermal actuator comprises two bimetallic arms, each mechanically coupled to the micromirror on opposite sides of the hinge.

4. A device as in claim 3, wherein the bimetallic arms each comprise an upper and a lower layer joined together to form a unified whole, wherein at least one of the layers is an imperfect conductor, and wherein the upper and lower layers have different coefficients of thermal expansion.

5. A device as in claim 3, wherein the bimetallic arms each comprise an upper and a lower layer joined together to form a unified whole;
   wherein one of the layers is sufficiently resistive so that electrical current passing through it will heat the bimetallic arm; and
   wherein the upper and lower layers of each of the bimetallic arms have a sufficiently different coefficient of thermal expansion so that heat generated by passing a current through the sufficiently resistive layer will cause sufficient deflection of the bimetallic arm to overcome normal stiction forces.

6. A device as in claim 5, wherein the upper layer of each of the bimetallic arms has a lower coefficient of thermal expansion than the lower layer of each of the bimetallic arms.

7. A device as in claim 6, wherein the hinge comprises a pivot platform and a hinge bar, wherein the hinge bar is mounted on the pivot platform and the micromirror is mounted on the hinge bar.

8. A device as in claim 7, wherein each of the bimetallic arms are cantilevered, supported at one end, and extending out to interact mechanically with the pivot platform; and wherein each of the bimetallic arms angles slightly downward when in its neutral, unflexed state.

9. A device as in claim 8, wherein the bimetallic arms each attach to the pivot platform.

10. A device as in claim 5, wherein one layer of the bimetallic arms is comprised of titanium nitride, and wherein the remaining layer of the bimetallic arms is comprised of silicon dioxide.

11. A device as in claim 9, wherein one layer of the bimetallic arms is comprised of titanium nitride, and wherein the remaining layer of the bimetallic arms is comprised of silicon dioxide.

12. A device as in claim 5, wherein the electrostatic actuator comprises a plurality of electrodes, with at least one of the plurality of electrodes located on each side of the hinge.

13. A device as in claim 11, wherein the electrostatic actuator comprises two electrode pairs, wherein one of the electrode pairs is located beneath the micromirror on each side of the hinge, and wherein each of the electrode pairs further comprises an upper electrode that interacts electrostatically upon the micromirror and a lower electrode that interacts electrostatically upon the pivot platform.

14. A device as in claim 12 operable such that when voltage is applied to one of the electrodes and current is applied to one of the bimetallic arms, the application of the current and the voltage can be coordinated to jointly position the micromirror into one of the two stable positions.

15. A device as in claim 13 operable such that when voltage is applied to one of the electrode pairs and current is applied to one of the bimetallic arms, the application of the current and the voltage can be coordinated to jointly position the micromirror into one of the two stable positions.

16. A device comprising:
   a substrate;
   a reflective surface;
   a hinge supporting the reflective surface above the substrate in such a way as to allow the reflective surface to pivot between two stable positions;
   two electrostatic attractors, one located on each side of the hinge, and each in electrical communication with the reflective surface in such a way as to allow for electrostatically attracting the reflective surface; and
   two electrothermal actuators, each mechanically coupled to the reflective surface on opposite sides of the hinge.

17. A device as in claim 16, wherein each of the electrothermal actuators is a bimetallic arm, wherein each bimetallic arm is coupled to the reflective surface in such a way as to apply a mechanical force to the reflective surface to assist in positioning the reflective surface in one of the two stable positions.

18. A device as in claim 17, wherein the bimetallic arms each comprise an upper and a lower layer joined together to form an integrated whole, wherein at least one of the layers is an imperfect conductor, and wherein the upper and lower layers have different coefficients of thermal expansion.

19. A device as in claim 17, wherein the bimetallic arms each comprise an upper and a lower layer joined together to form an integrated whole;
   wherein one of the layers is sufficiently resistive so that electrical current passing through the bimetallic arm will heat the bimetallic arm; and
   wherein the upper and lower layers of each of the bimetallic arms have a sufficiently different coefficient of thermal expansion so that heat generated by passing a current through the bimetallic arm will cause sufficient deflection of the bimetallic arm to overcome normal stiction forces experienced by the reflective surface.

20. A device as in claim 19, wherein the lower layer of each of the bimetallic arms comprises titanium nitride and the upper layer of each of the bimetallic arms comprises silicon dioxide.

21. A device as in claim 19, wherein each of the electrostatic attractors are electrode pairs, and each of the electrode pairs are in electrical communication with the reflective surface in such a way as to electrostatically position the reflective surface in at least one of the two stable positions.

22. A device as in claim 19 operable such that when voltage is applied to one of the electrostatic attractors and current is applied to one of the bimetallic arms, the application of the current and the voltage can be coordinated to jointly position the reflective surface into one of the two stable positions.

23. A device as in claim 19, wherein:
   the upper layer of each of the bimetallic arms has a lower coefficient of thermal expansion than the lower layer of each of the bimetallic arms;
   the hinge further comprises a pivot platform, with the reflective surface mounted upon the pivot platform;
   each of the bimetallic arms are cantilevered, supported at one end, and extending out to interact mechanically with the pivot platform; and
   each of the bimetallic arms angles slightly downward when in its neutral, unflexed state.

24. A device as in claim 23, wherein the lower layer of each of the bimetallic arms comprises titanium nitride and the upper layer of each of the bimetallic arms comprises silicon dioxide.

25. A device as in claim 23 operable such that when voltage is applied to one of the electrostatic attractors and current is applied to one of the bimetallic arms, the application of the current and the voltage can be coordinated so that the electrostatic attraction of the electrostatic attractor works in conjunction with the mechanical interaction of the bimetallic arm in order to jointly orient the reflective surface.

26. A method for orienting a pivotal, bistable micromirror, using two electrodes in electrical communication with the micromirror and two electrothermal actuators mechanically coupled to the micromirror, the method comprising the steps of:
   applying a constant voltage to the micromirror;
   applying voltage to one electrode in order to electrostatically cause the micromirror to pivot; and
   applying current to one electrothermal actuator in order to mechanically assist in pivoting the micromirror.

27. A method as in claim 26, wherein the application of the current and the voltage can be coordinated, so that the electrostatic attraction of the electrode works in conjunction with the mechanical force of the electrothermal actuator in order to jointly pivot the micromirror into one of the bistable positions.

28. A method as in claim 27, further comprising the step of simultaneously switching the application of voltage from one of the electrodes to the other of the electrodes and the application of current from one of the electrothermal actuators to the other of the electrothermal actuators, thereby causing the micromirror to pivot from one bistable position to the other.

* * * * *